United States Patent [19]

Haas

[11] Patent Number: 4,616,805

[45] Date of Patent: Oct. 14, 1986

[54] FUEL SHUT-OFF VALVE

[75] Inventor: Albert L. Haas, Cass City, Mich.

[73] Assignee: Walbro Corporation, Cass City, Mich.

[21] Appl. No.: 740,575

[22] Filed: Jun. 3, 1985

[51] Int. Cl.[4] .......................................... F16K 31/528
[52] U.S. Cl. .................................... 251/297; 251/252; 74/99 A
[58] Field of Search ............... 251/252, 253, 263, 297; 74/99 A

[56] References Cited

U.S. PATENT DOCUMENTS

| | | | |
|---|---|---|---|
| 953,650 | 3/1910 | Walsh | 251/253 |
| 1,036,012 | 8/1912 | Schuermann | 251/253 |
| 1,490,628 | 4/1924 | Myers | 251/253 |
| 2,069,848 | 2/1937 | Pickup | 251/252 |
| 2,664,265 | 12/1953 | Howser | 251/253 |
| 3,127,786 | 4/1964 | Wooley | 251/297 |
| 4,462,567 | 7/1984 | Habicht | 251/297 |

*Primary Examiner*—Martin P. Schwadron
*Assistant Examiner*—Sheri M. Novack
*Attorney, Agent, or Firm*—Barnes, Kisselle, Raisch, Choate, Whittemore & Hulbert

[57] ABSTRACT

A fuel shut-off valve for an internal combustion engine carburetor which includes passages leading from a fuel source to a controlled fuel passage. A valve seat is interposed between these passages disposed to be closed by a plunger type valve biased toward the valve seat by a coil spring. An actuator for the valve includes a configuration to keep the valve from rotating and a cross-pin transfixing a valve stem on the plunger type valve. A cam lever has a collar surrounding the valve stem with cam surfaces to engage the cross-pin which upon rotation will lift the valve off of the valve seat. A radial detent groove at the top of the cam surface receives the cross-pin to establish the open position of the valve. Release of the pin from the detent groove causes the pin to ride down the cam surface under the bias of the spring to a closed position.

2 Claims, 4 Drawing Figures

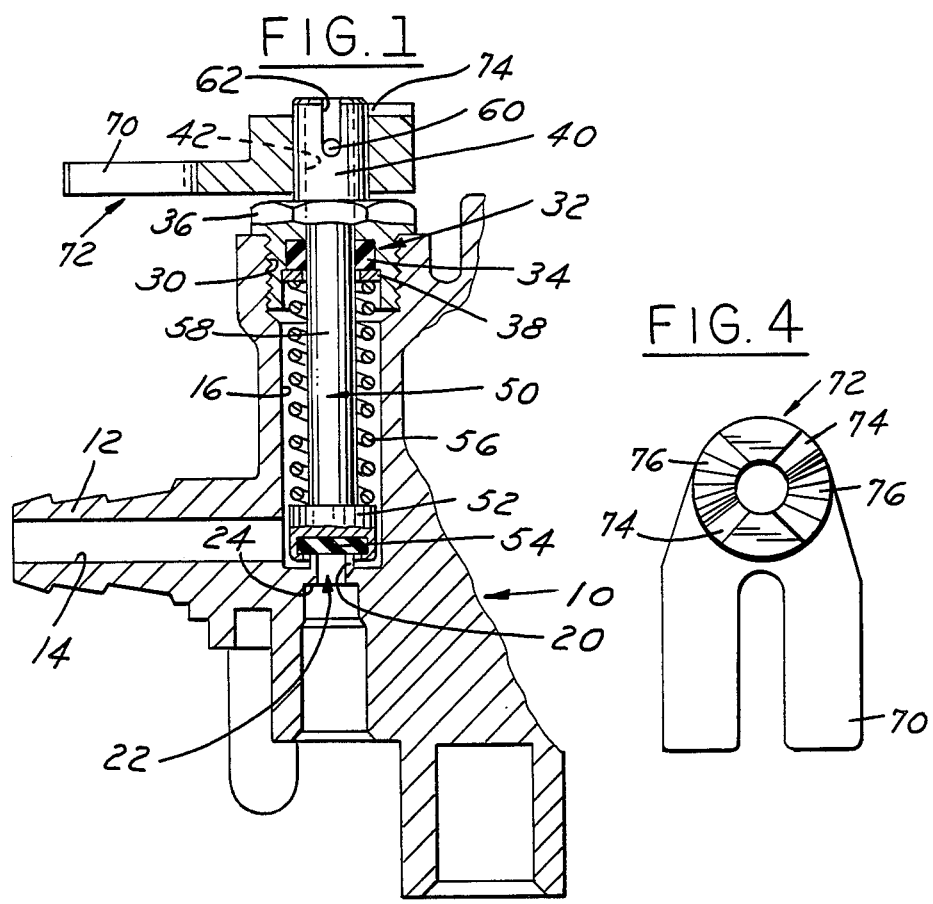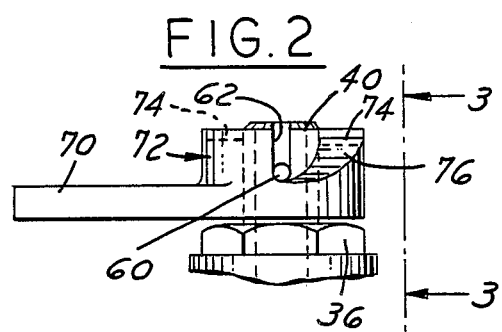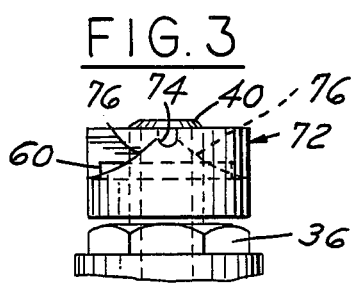

FUEL SHUT-OFF VALVE

FIELD OF INVENTION

Fuel shut-off valves for internal combustion engines.

BACKGROUND AND OBJECTS OF THE INVENTION

In the use of small internal combustion engines, it is frequently desirable for the operator to shut off the fuel supply from the tank when an engine is not in use. With engine powered lawn mowers, weed cutters, snowmobiles, outboard engines, and chain saws, the utilities are frequently stored in a garage or a basement. In many instances, the storage may result in the particular unit being tilted out of its normal use position with the fuel tank much higher relative to the carburetor than is usual. In other instances, the storage may be such that the fuel tank becomes heated by the sun or some other source of heat which will cause the fuel to expand and flood the carburetor to an overflow condition.

In addition, for safety reasons, a fuel shut-off valve may be desirable to prevent youngsters from operating the devices. Reference is made to U.S. Pat. No. 2,935,977 issued May 10, 1960 to William C. Eberline.

It is, therefore, an object of the invention to provide an easily operated fuel shut-off valve interposed between the fuel supply and the carburetor of an engine which can be operated directly by a manual control or operated by a remotely controlled cable. A further object is a fuel shut-off valve design which insures positive closing once the valve is actuated. A further object is a fuel shut-off valve which is held open in a positive way but once released from the open position will close automatically to a firm closed position.

Other objects and features of the invention will be apparent in the following specification and claims in which the invention is described and details are provided to enable persons skilled in the art to practice the invention, all in connection with the best mode presently contemplated for the invention.

BRIEF DESCRIPTION OF THE DRAWINGS

DRAWINGS accompany the disclosure and the various views thereof may be briefly described as:

FIG. 1, a vertical section of the valve assembly showing the operating parts.

FIG. 2, an elevation of a portion of the valve.

FIG. 3, an elevation taken on line 3—3 of FIG. 2.

FIG. 4, a top view of an operating lever.

DETAILED DESCRIPTION OF THE INVENTION AND THE MANNER AND PROCESS OF USING IT

WITH REFERENCE TO THE DRAWINGS, in FIG. 1, a body 10, which can be a carburetor body, has formed thereon a fuel inlet nipple 12 to receive a fuel line connection such that fuel from a fuel tank or other supply vessel with flow into passage 14. This passage 14 opens into a vertical valve recess 16, as viewed in FIG. 1, which is a cored recess. As will be later described, this recess may have a hexagonal cross-section. The housing can be a cast piece formed of suitable metallic material normally used for carburetors.

At the lower end of recess 16 is formed an annular raised wall 20 which provides a sealing surface. The sealing wall 20 surrounds the top of a stepped passage 22 which enlarges to provide a valve seat 24. A fuel regulating needle valve, not shown, can be threaded into passage 22 to control fuel flow from the tank passage 14. The top portion of the vertical valve recess 16 is enlarged into a threaded recess 30 to receive a threaded brass fitting 32 to serve as a valve stem guide and having a stepped recess in the lower end to receive a circular seal member 34 backed by a brass metal washer 38 which in some instances may be pressed in to retain the seal 34. The top of the fitting 32 has an octagonal section 36 to facilitate the installation and atop this section 36 is a turret 40 with a center bore 42.

A valve member made of brass or a dense plastic shown generally at 50 has an enlarged lower end 52 with a bottom recess to receive a sealing pad 54 made of a rubber synthetic, such as Viton (T.M.), which is resistant to hydrocarbon fuels. The lower periphery of the end 52 is open or staked-in to retain the pad 54. A coil compression spring 56 seats at the lower end on the enlargement 52 and at the top end against the washer 36.

The valve member has a stem portion 58 which projects upwardly through the turret 40 and is transfixed by a roll pin or cotter pin 60, the end or ends of which are vertically slidable in slots 62 in the turret 40 to prevent rotation of the valve 52 and stem 58. Thus, it will be seen that the valve 52 and valve stem 58 may be lifted against the bias of the spring 56 to open the valve seat 20 to the fuel inlet passage 14.

The actuation of the valve is accomplished by a bifurcate lever 70 having a collar 72 which surrounds the turret 40. This collar has a radially extending locking notch 74 on the top surface. It also has a helical ramp section 76 as shown in FIG. 2. The notch 74 is located at the top of the ramp 76 and the lower side of the notch is depressed from the top of the ramp as shown in FIG. 2. The ramp descends from the cross notch 74 to the base of the vertical groove 62. The roll pin 60 extends over the ramp 76 and turning of the cam lever 70 causes the pin 60 to ride up the cam surface 76, thereby lifting the valve stem 58 against the bias of the spring 56 and opening the valve seat 20 to the passages 14 and 22. A full 90° turn of the lever will lodge the end of the roll pin 60 in the detent groove 74, thus retaining the valve in the open position. A slight motion of the lever 70 in the reverse direction will release the detent action of the pin 60 and it will, under the bias of the spring 56, ride down the ramp 76 to the closed position shown in FIG. 1.

The lever 70 may be constructed to operate from either side of the turret 40 and the action may be either a right-hand or left-hand motion. The lever and collar 70, 72 may be constructed of a dense plastic which will have a low friction characteristic. The lever 70 may be operated with the fingers in some installations or by a remotely controlled cable. The movement of the lever in one direction will open the valve and the operator will be conscious of the "click" as the detent pin seats in the groove 74. Upon reversal of the action, the detent release will take place immediately and the remainder of the motion will occur under the action of the spring 56.

As previously indicated, the recess 16 may have hexagonal cross-section formed by coring in the casting process. The valve 52 can be similarly shaped so that it will not turn in the recess. With the arrangement, the turret 40 may be eliminated and the lever collar 72 can fit directly over the valve stem 58 through which the roll pin will pass. The collar cams the valve stem directly up as in the previous embodiment and the complimental hexagonal shape of recess 16 and valve 52 will prevent the valve from turning.

What I claim is:

1. A fuel shut-off valve to be interposed between a fuel source passage and a fuel utilization device which includes:
   (a) a body having a valve bore,
   (b) means forming a seat at one end of said bore open on one side to a fuel source passage and at another side to a fuel utilization passage,
   (c) a valve element slidable in said bore having a valve head at one end to cooperate in opening and closing said valve seat and an actuator stem extending from said valve head,
   that improvement which comprises,
   (d) a valve stem guide fitting closing the end of side bore opposite said seat, and a stationary turret on said fitting having an axial side slot,
   (e) an annular valve stem seal positioned in said bore adjacent said fitting backed by means to retain said seal,
   (f) means to bias said valve head to a closing position on said seat and to retain said seal adjacent said fitting comprising a coil spring seated at one end against said means to retain said seal and at the other end against said valve head,
   (g) means to actuate said valve to an open position comprising:
      (1) an actuating lever,
      (2) a collar on and integral with said lever having a ramp surface rising from a point of origin to a point at the top of said collar,
      (3) follower means comprising a cross-pin on said valve stem to ride on said ramp whereby turning said collar and lever raises said valve stem and said valve head against the bias of said coil spring to open said valve seat, and
   (h) means to restrain said valve element against rotation in said bore comprising an extension on said cross-pin engaged in said side slot of said turret.

2. A fuel shut-off valve to be interposed between a fuel source passage and a fuel utilization device which includes:
   (a) a body having a valve bore,
   (b) means forming a seat at one end of said bore open on one side to a fuel source passage and at another side to a fuel utilization passage,
   (c) a valve element slidable in said bore having a valve-closing-end and an actuator stem, and
   (d) means to bias said valve end to a closing position on said seat, that improvement which comprises:
      (1) means to restrain said valve element against rotation in said bore, and
      (2) means to actuate said valve to an open position comprising:
         (a) an actuation lever,
         (b) a collar on said lever surrounding said valve stem having a ramp surface rising from a point of origin to a point at the top of said collar, and
         (c) follower means on said valve stem to ride on said ramp whereby turning said colar raises said valve stem and said valve-closing-end against said bias means,
   (e) said collar on said actuation lever having two ramp surfaces diametrically opposed to adapt to right or left positions of said actuating lever.

* * * * *